United States Patent [19]

Eisenmann et al.

[11] Patent Number: 4,943,268

[45] Date of Patent: Jul. 24, 1990

[54] AUTOMATIC TWO-SPEED TRANSMISSION FOR THE DRIVE OF AUXILIARY UNITS OF A MOTOR VEHICLE ENGINE

[76] Inventors: Siegfried A. Eisenmann; Hermann Härle, both of Conchesstr. 23, D-7960 Aulendorf, Fed. Rep. of Germany

[21] Appl. No.: 366,791

[22] Filed: Jun. 15, 1989

[30] Foreign Application Priority Data

Jul. 4, 1988 [DE] Fed. Rep. of Germany ....... 3822611

[51] Int. Cl.⁵ ............................................. F16H 57/10
[52] U.S. Cl. ......................................... 475/95; 475/93
[58] Field of Search .................... 475/89, 90, 92, 93, 475/94, 95, 99, 100

[56] References Cited

U.S. PATENT DOCUMENTS

| | | | |
|---|---|---|---|
| 2,154,710 | 4/1939 | Thoma | 475/95 X |
| 2,526,175 | 10/1950 | Van Alstyne et al. | 475/95 |
| 2,552,010 | 5/1951 | Marsell | 475/95 |
| 2,787,920 | 4/1957 | Blaha | 475/95 |
| 2,987,943 | 6/1961 | Lemieux et al. | 475/94 |
| 3,180,182 | 4/1965 | Tiberio | 475/95 |
| 3,835,730 | 9/1974 | Pemberton | 475/90 X |

OTHER PUBLICATIONS

Volkswagen AG Publication.

*Primary Examiner*—Dirk Wright

[57] ABSTRACT

In an automatic two-speed shift transmission for the drive of auxiliary units, such as the dynamo, of a motor vehicle internal-combustion engine, the speed change is effected by the centrifugal-force-dependent actuated throttling of a hydrostatic control element.

26 Claims, 13 Drawing Sheets

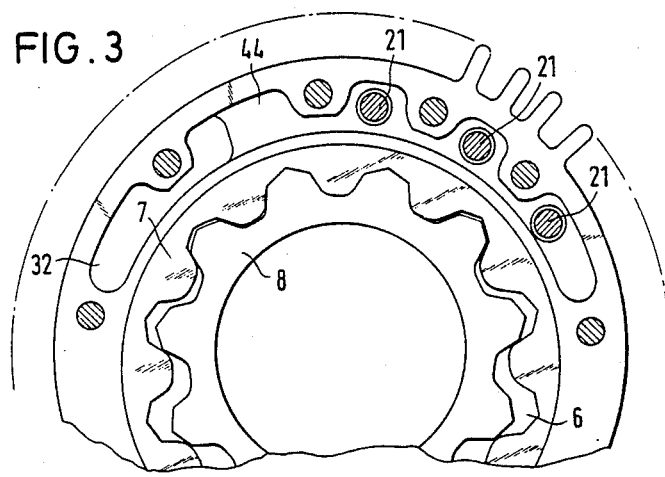
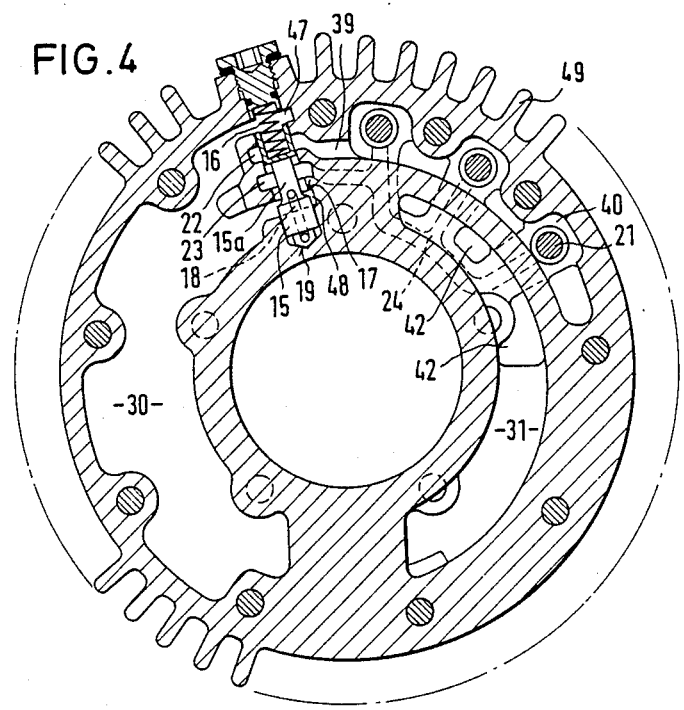

AUTOMATIC TWO-SPEED TRANSMISSION FOR THE DRIVE OF AUXILIARY UNITS OF A MOTOR VEHICLE ENGINE

BACKGROUND OF THE INVENTION

1. Field of the Invention

The invention relates to an automatic two-speed transmission (i.e. a two-speed gear unit which on reaching a predetermined speed of rotation automatically changes the transmission ratio) for the drive of one or more auxiliary units (e.g. the dynamo, the fan, a refrigeration compressor or a power steering pump) of a motor vehicle internal-combustion engine (usually this is a reciprocating-piston engine but it can also be for example a rotary piston engine) comprising a gear set in which at least one gear of which the axis of rotation orbits about the axis of rotation of another gear concentric with the input shaft of the transmission is in engagement with said other gear, a control element which is formed as freewheel, and a further control element rotating with the input shaft and actuable by centrifugal force for retarding and releasing the relative rotation between the gears of the gear set.

2. Description of the Prior Art

Motor vehicle internal-combustion engines operate in a very large speed of rotation range. If certain auxiliary units are driven with a constant transmission ratio by the engine then at higher speeds of rotation they are driven with a far higher speed than necessary because at the lowest speed of rotation, i.e. the idling speed of the engine, these auxiliary units must also be driven at a certain minimum speed. A result of this is that auxiliary units at higher speeds of rotation take up far more power than is necessary. To overcome this difficulty automatic two-speed gear units or transmissions of the aforementioned type have been proposed. They ensure that when a certain speed of rotation is exceeded the transmission ratio with which the corresponding auxiliary units are driven is reduced and when said speed is exceeded the reduced transmission ratio is again increased to the previous value. Basically of course an infinitely variable transmission would be ideal for this purpose. However, such a transmission is too complicated in production, too heavy and too large for installation in a motor vehicle.

Consequently, a two-speed transmission is accepted and can be made relatively small, light and with relatively few components. Such an automatic two-speed or two-step transmission is known in which as is also preferred in the invention the input shaft is the crankshaft of the engine or an extension thereof. Non-rotatably connected to the crankshaft is the ring gear of a planetary transmission or gear unit. The input shaft is surrounded by a sleeve which is non-rotatably mounted on the engine housing and on which the sun gear of the planetary transmission is mounted by means of a freewheel. The planet gear carrier of the planetary transmission is in turn rotatably mounted on said sleeve and carries at the outside the output means such as a V-belt groove. The planet carrier can be blocked with the sun gear by means of a mechanically engageable and disengageable centrifugal force clutch or coupling At low speed of rotation of the engine the multiple disc clutch between the planet carrier and the sun gear is closed so that the V-belt pulley serving as output revolves with the engine speed. On reaching a predetermined speed of rotation the centrifugal force clutch opens so that the planet carrier can now revolve relatively to the sun gear. The sun gear rigidly connected to the input shaft now drives via the planet wheels the planet carrier so that the latter revolves with reduced speed. When the speed of rotataion drops this process takes place in the reverse direction.

In transmissions of the type improved with the invention it must of course be ensured that the changing up of the transmission ratio when the speed of rotation drops takes place at a lower speed of rotation than the changing down of the transmission ratio with increasing speed because otherwise the clutch would continuously change up and down within a very narrow speed range. A certain hysteresis effect is therefore necessary. In the known transmission this is to be achieved by the friction in the centrifugal force regulator.

Transmissions of this type, from which the invention proceeds, and other known similar transmissions or gear units have substantial disadvantages. One of them is the mechanical shift mechanism which is prone to wear. This is extremely disadvantageous because transmissions of the type in discussion change speed very often, for example far more than an automatic transmission in a motor vehicle drive train. A further defect is the large axial extent which is usually required and which should be kept as short as possible in particular on installation of the engine with the crankshaft in the travelling direction. Furthermore, many of the known transmissions are relatively complicated in construction.

SUMMARY OF THE INVENTION

The invention thus has the objective of eliminating these and other defects of the known automatic two-speed transmissions. In particular, it is based on the problem of further developing a transmission of the type from which the invention proceeds so that said transmission is simple in construction, has a short axial overall length, requires little production and expenditure and of course operates satisfactorily, i.e. changes speed reliably and, as is particularly important, carries out the shift operations practically free of wear.

The invention therefore proposes in an automatic two-speed transmission for the drive of at least one auxiliary unit (dynamo, fan, etc.) of a motor vehicle internal-combustion engine by the latter comprising a gear set in which at least one gear of which the axis of rotation orbits about the axis of rotation of another gear concentric with the input shaft of the transmission is in engagement with said other gear, a control element which is formed as freewheel, and a further control element rotating with the input shaft and actuable by centrifugal force for retarding and releasing the relative rotation between the gears of the gear set, the improvement that the transmission comprises a housing revolving concentrically to an input shaft and containing a fluid supply, at least two gears of the gear set cooperate in the manner of a hydrostatic pump and can be influenced with the fluid, and the centrifugal control element also revolving with the housing controls the influencing of the pump. As suitable fluid for example hydraulic fluid can be employed as used for instance in power steering pumps.

With such a construction, with which the gear set for example as in the prior art can be constructed as planetary mechanism or as ring gear pump with a pinion which is arranged concentrically to the input shaft of the transmission and about which a correspondingly larger internally toothed ring gear can rotate, the speed changing with the invention is free from wear because by means of the centrifugal force control or shift element depending on the construction the influx to the pressure chamber of the pump, the efflux therefrom or the flow through the pump can be blocked and as a result the gears of the gear set cooperating as gear pump can in turn be prevented from rotation relatively to each other and in this manner blocked or released for rotation. Depending on the design, by this blocking of the gear set for example a transmission member can be locked against rotation or can be connected to another revolving transmission member so that in conjunction with the freewheel two different output speeds can be achieved. With this type of shifting of the transmission a certain slip will admittedly always occur because in the "hydrostatic pump" gap losses of course occur. However, in practice this slip has no significance whatever and does not manifest itself as disadvantage. Due to the fact that the arrangement is accommodated in a housing revolving concentrically to the input shaft the entire hydraulic system can rotate therewith and the centrifugal force regulation is made easier. The practically wear-free configuration of the centrifugal force control or shift element is achieved in that the moving parts thereof lie in the hydraulic fluid, normally in a suitable oil.

The gear set according to the invention, depending on the design, may be only part of a centrifugal force control or shift element or both part of said control element and part of the mechanism serving for the speed change.

In the invention the output may for example be a belt pulley connected fixedly to the housing. It may however also be formed by a separate pulley or an appropriate gear or the like. The driveshaft may for example be the shaft of a rotary piston engine or the camshaft of a reciprocating-piston engine. It may also be the shaft of another unit to be driven proportionally to the engine speed, for example of the cooling water pump of the engine. Preferably, however, the input shaft of the transmission is the crankshaft of the engine or a corresponding extension thereof.

As the examples described below will show the transmission or gear unit according to the invention may be constructed as closed short unit mounted on the input shaft which in many cases can even be subsequently mounted on the engine of a finished construction.

As already indicated, in a preferred embodiment set forth in claim 2 the gear set may be formed by the pinion and inner ring gear of a ring gear pump of which the suction and pressure chambers are connected via the fluid circulation which can be throttled by means of the valve arrangement in dependence upon the centrifugal force.

In the theoretically simplest case the suction chamber and the pressure chamber of the pump are connected by a short-circuit conduit in which lies a shutoff valve actuated in dependence upon the centrifugal force. When said valve is closed a high pressure builds up in the pressure chamber and prevents rotation of the pump. However, as is often advantageous, it is also possible in the fluid circuit in accordance with claim 2a to provide behind the pressure chamber of the pump a partially gas-filled fluid supply chamber, the centrifugal force control element then controlling the supply from the fluid supply chamber to the suction chamber of the pump.

If a high flow resistance is provided between the pressure chamber and the fluid supply chamber; then when the inlet is open the pressure in the pressure chamber is high and the pump is blocked. If the influx is interrupted the pump cannot suck fluid in, the pressure in the pressure chamber drops over the high flow resistance and the pump rotates "empty", i.e. is filled only with gas without transmitting any torque.

The ring gear pump may preferably be a so-called Eaton pump, i.e. a pump in which the internally toothed ring gear has only one tooth more than the pinion and all the teeth are simultaneously in engagement. Fundamentally however the ring gear pump may also be one in which the tooth number difference between pinion and ring gear is greater than 1 and the then resulting crescent-shaped cavity opposite the point of deepest tooth engagement is filled by a filler.

In the embodiment according to claim 2 or 2a it is preferable for the pump pinion to be arranged in accordance with claim 3 concentrically to the input shaft, the ring gear mounting being cut out in the ring gear pump housing mounted concentrically to the input shaft. Depending on the design the pinion may be arranged rotatably or non-rotatably. Fundamentally, however, it is also possible to mount the pinion eccentrically, for example on an eccenter of the output shaft, and the ring gear concentrically.

In a first preferred embodiment of the invention in accordance with claim 4 two output elements are provided of which the one is drivable via a freewheel directly by the crank-shaft and the other is fixedly connected to the pinion of the ring gear pump of which the housing is fixedly connected to the crankshaft. It is then possible when the fluid circuit is open for the ring gear to revolve relatively to the pump housing so that the one output element is entrained by the input shaft via the freewheel whilst with a closed fluid circulation the pump housing entrains the pinion and thus transmits in fast speed.

With this construction, apart from the actual transmission a second shaft is also necessary on which counter elements cooperating with the two output elements, which are normally formed as belt pulleys, are provided, i.e. likewise belt pulleys. The pulley driven by the smaller pulley directly driven by the crankshaft via the freewheel must be larger whilst the large output pulley fixedly connected to the pinion cooperates with a relatively small pulley on the driven shaft. In this manner the peripheral speed of the belt on the one pulley which is driven via the freewheel is always the greater speed when the drive is effected via the other output pulley on blocking or throttling of the fluid circulation.

This construction only needs a total of two gears and this is a considerable advantage.

In this construction, it is advantageous in accordance with claim 5 to arrange the ring gear pump housing including the transmission housing which is arranged relatively to the two output elements non-rotatably on the input shaft.

In the embodiment just described the valve arrangement of the centrifugal force control element is preferably constructed as set forth in claims 15 to 19, in particular claim 19. Further essential features and advantages of this embodiment will be apparent from the description of the first example of embodiment given below.

In a second preferred embodiment of the invention the transmission according to claim 6 is formed as planetary gear or transmission, a ring gear pump as additional element then retarding the smaller central gear of the planetary transmission or releasing said gear for rotation on retardation by throttling the fluid circulation. For this reason in this case the ring gear pump is advantageously mounted centrally in the sun gear of the planetary transmission and with its housing, which in this case is thus rotatably arranged in the transmission housing, carries the sun gear.

It is advantageous here in accordance with claim 8 to support the pinion of the gear pump non-rotatably, i.e. for example on the engine housing, whilst the freely rotatably mounted ring gear pump housing is fixedly connected to the sun gear.

Preferably, in accordance with clair 9 the output fixedly connected to the transmission housing, as a rule a pulley or the like, is drivable via a freewheel directly by the input shaft, the planet carrier then being fixedly connected to the input shaft and the ring gear fixedly connected to the transmission housing.

In this second preferred embodiment, which corresponds to the second example, the centrifugal force valve of the valve arrangement is preferably constructed in accordance with claims 20 to 22, in particular claim 22.

In this case the ring gear pump does not even require an outlet passage on its pressure side if in accordance with claim 2a the centrifugal force valve arrangement controls the influx of oil from the transmission housing into the ring gear pump housing. For if the throttle opening in the fluid circuit is then closed, in the ring gear pump the pressure preventing the rotation thereof relatively to the pinion diminishes very rapidly due to the unchangeable gap losses and the pump can then rotate filled only with oil vapour or air.

In the first preferred construction in which the V-belt pulleys are formed as transmission elements, the valve arrangement is preferably one exhibiting a pronounced hysteresis behaviour because the shutoff valve which short-circuits the connection between the pump pressure chamber and pump suction chamber on increasing speed of rotation does not interrupt this connection again on diminishing speed of rotation until a speed is reached which is substantially lower than the speed at which it frees the short-circuit conduit.

In the construction now being discussed with the throttle valve configuration, however, the fluid circulation is gradually throttled so that the transition from one transmission ratio to the other extends over a relatively large range of speed of rotation of for example 200 to 300 rpm so that in this case a hysteresis behaviour is not necessary.

Although the construction with the throttle valve slide is preferred, basically with this design as well a valve arrangement according for example to claim 19 may be provided.

According to a third preferred embodiment of the invention the transmission is also constructed as in the prior art as planetary gear unit but in accordance with claim 10 the gear set is formed by at least two intermeshing gears of the planetary transmission.

It is preferred in accordance with claim 11, for creating the "gear pump", for a filler to fill the space between the outside diameter faces of the meshing gears of the gear set where the toothings thereof taper towards each other, except for a pressure chamber near the engagement region thereof. The tooth gaps of the two intermeshing gears in the regions in front of the intermeshing region thus act as fluid transport chambers of the pump. The retardation or release of the intermeshing planetary transmission gears is then effected by controlling an influx passage to the intake region of the gear pump thus formed or an efflux passage from the pressure chamber.

In accordance with claim 12, the sun gear and at least one planet gear preferably form the gear set or the gear pump. (A symmetrical arrangement is of course preferred in which a plurality of planet gears distributed uniformly over the periphery cooperate in the manner of a gear pump). This has the advantage that the centrifugal force forces the fluid from the outside into the tooth gaps of the planet gears as long as the fluid level in the transmission housing is high enough for the outer regions of the planet gears to dip into said fluid.

The planetary gearing here is advantageously constructed as so-called plus transmission, i.e. each planet gear meshes with another planet gear and a central gear. As a result the planet gears cooperating with the ring gear act as supply means for the sun gear when the filling piece also covers the outer diameter faces of the latter. The planetary transmission in this case is a reduction transmission, i.e. one which reduces the output speed.

Thus, in this third embodiment the planetary transmission is blocked in each case in that a pressure is built up in the pressure chamber by the pump action and blocks the transmission. The control by the centrifugal force valve arrangement is advantageously formed in accordance with one of claims 15 to 19, preferably according to claim 19. By opening the shutoff valve the pressure space is made pressureless, the gears rotating however substantially permanently in the oil filling disposed in the transmission housing which (when of course the housing rotates should fill the outer inner ring space of the housing at least beyond the axes of the planet gears but at the most up to the outer diameter of the sun gear.

Thus, in this design the gears of the planetary transmission revolve with reduced speed, transmitting the load in the upper speed range of the engine in the oil bath.

If it is desired to eliminate the heat losses occurring thereby then advantageously in accordance with claim 13 the planetary transmission is arranged in an inner housing revolving in the transmission housing, the fluid influx of said inner housing being blockable by means of a valve arrangement and said housing dischargeable via small throttle passages through the pump action. As a result when it is not blocked the planetary transmission operates with only a minimum oil content sufficient however for the necessary lubricating action.

In this fourth preferred embodiment of the invention the valve arrangement is preferably as set forth in claims 20 to 22, more especially according to claim 22.

Generally, for the valve arrangement of the centrifugal force control element in accordance with a preferred embodiment a centrifugal force valve connected to the fluid circuit in the housing rotating with the input shaft is mounted in the pump housing displaceably by the centrifugal force against spring force and controls the flow in the circuit. This embodiment is advantageously further developed in accordance with any one of claims 15 to 19. Such a construction has the essential advantage that the fluid pressure moving the shutoff valve into its position short-circuiting the fluid circulation, i.e. the pressure changing the transmission "up", is lower than the pressure which changes the fluid transmission down and this gives a pronounced hysteresis effect. A gradual transmission is achieved with the valve construction according to claims 20 to 22 which again characterize other preferred embodiments A particularly advantageous construction of the centrifugal force control element with gradual transition is characterized in claims 23 to 25. This permits a particularly simple construction of the planetary transmission with single planet gears. Basically, for example with direct drive of the planet carrier by the crankshaft, the displacement body may be heavier than the fluid so that when the shift speed is exceeded the influx to the suction region is initiated. The construction according to claims 24 and 25 is however preferred in which on exceeding the shift speed the influx to the suction region is reduced. The housing is then advantageously fixedly connected to the crankshaft whilst the output disc is fixedly connected to the planet carrier and the sun gear is supported against the housing via a freewheel.

BRIEF DESCRIPTION OF THE DRAWINGS

Hereinafter with the aid of the drawings as constructional examples five preferred embodiments of the transmission according to the invention will be described, from which further advantages and properties of the invention will be apparent.

FIG. 3 shows the section III—III of FIG. 1.

FIG. 4 shows the section IV—IV of FIG. 1.

DESCRIPTION OF THE PREFERRED EMBODIMENTS

In the transmission schemes the blocking point is denoted in each case by a horizontal V.

In the following description of the various embodiments the transmission schemes will not be separately described because the description otherwise applies to them as well and explains them adequately.

The transmission illustrated in FIGS. 1 to 4 is a returning belt transmission as highspeed drive with pressure throttle regulation showing a pronounced hysteresis in the centrifugal force control element forming a hydrostatic coupling.

Figure 2:
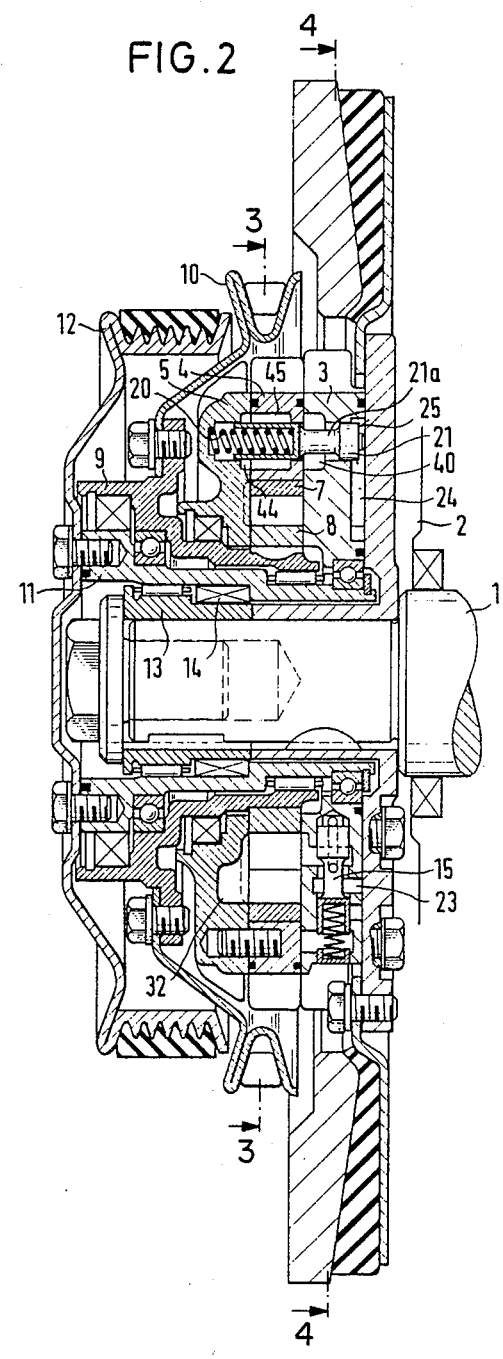
FIG. 2 shows an axial section through the essential parts of the transmission according to FIG. 1.

As apparent from FIG. 2 at the end of the crankshaft 1 of a reciprocating-piston internal-combustion engine opposite the drive coupling of said engine, which is not shown, a flange 2 is non-rotatably mounted and in turn carries the housing of a ring gear pump. The pump housing forms at the same time the transmission housing. It consists of two end plates 3 and 5 and a cover ring 4 which holds the plates 3 and 5 apart and thus forms between them the pump cavity. In this case the pump housing is thus rigidly mounted on the crankshaft and revolves with the speed of rotation thereof. In the cover ring 4 of the pump housing a ring gear or hollow gear 7 is mounted freely rotatably. The internally toothed ring gear 7 meshes with a pinion 8 and cooperates with the latter in the manner of a so-called Eaton pump (FIG. 3).

In FIG. 4 on the left the suction chamber 30 of the pump formed in the end plate 3 can be seen and on the right the pressure chamber 31 formed in the same chamber. These two chambers may have supplements in the opposite end plate 5 as shown at 32 in FIG. 2. A short-circuit connection from the pressure chamber 31 to the suction chamber 30 can be shut off by means of the three valves 21 which will be explained below (FIGS. 2 and 4).

Figure 1:
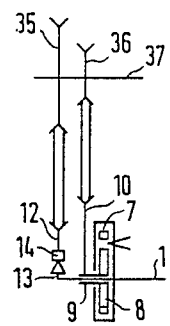
FIG. 1 shows the transmission scheme of a first embodiment in which the speed change is via pulleys.

The pinion 8 of the pump meshing with the ring gear 7 thereof is mounted non-rotatably on an output sleeve 9 which carries a larger pulley 10 and is mounted freely rotatably on the hollow shaft 11. The hollow shaft 11 itself carries a second V-belt pulley which is formed here as multiple belt pulley 12 and is in turn rotatably mounted by means of a freewheel 14, permitting it to overtake the crankshaft 1, on a bearing sleeve 13 which in turn is secured non-rotatably to the crankshaft 1. If the output is with closed hydrostatic coupling, i.e. blocked fluid circulation via the ring gear pump 7, 8 through the V-belt pulley 10, then due to the dimensioning of the effective peripheries of the lay pulleys 35 and 36 as shown in FIG. 1 the pulley 12 rotates faster than the crankshaft so that the freewheel 14 lifts off and an up drive takes place, i.e. the driven shaft 37 carrying the pulleys 35 and 36 now runs faster than the crankshaft 1.

When the hydrostatic coupling is opened, i.e. the fluid flow through the short-circuit conduit connecting the pressure chamber 31 and suction chamber 30 of the pump is freed, no appreciable torque can then be transmitted via the pump housing 3, 4 and 5 and the pump gears 7, 8 to the pulley 10. The torque is now transmitted from the crankshaft directly via the freewheel 14, which now entrains the pulley 12, to the output or drive shaft 37. The auxiliary units of the engine now rotate more slowly in accordance with the transmission ratios chosen, as is desirable for the main operating range of the engine.

The opening of the hydrostatic coupling, i.e. the freeing of the short-circuit conduit, preferably takes place at an engine speed which lies above the idling speed but below the speed range corresponding to normal engine operation.

Hereinafter the hydraulic valve arrangement will be described which controlled by the centrifugal force opens and closes the shutoff valve 21 in the bypass circuit of the ring gear pump 7, 8.

For this purpose, in a radial bore in the pump end plate 3 a centrifugal force valve piston 15 is mounted radially displaceably. Said valve piston 15 is shown in FIG. 2 offset by about 130° to enable its position to be apparent in axial section as well. The true position corresponds to that shown in FIG. 4. When the coupling rotates the valve piston 15 is subjected on the one hand to the influence of the centrifugal force which tends to urge it radially outwardly and on the other to the influence of a pressure spring 16 which tends to press it radially inwardly into the position shown in FIGS. 2 and 4.

As apparent from FIGS. 4 and 2 the bore guiding the centrifugal force piston 15 is extended by four ring chambers. The radially outermost ring chamber 47 and the radially innermost ring chamber 48 are connected as shown in FIG. 4 to the suction chamber 30 of the pulp lying on the left in said Figure.

The radially outer 22 of the two centre ring chambers 22 and 23, as likewise apparent from FIG. 4, is connected via the passage 39 to three ring chambers 40 which in the manner shown in FIG. 2 each surround the shutoff valve piston 21 and are connected via passages of which the openings into the piston chamber 31 are shown at 42 in FIG. 4 to the latter.

The last ring chamber 23 likewise surrounds the centrifugal force valve piston 15 and is connected via a conduit 24 which divides into three branch conduits and is shown in dashed line in FIG. 4 to fluid spaces in front of the end faces 25 of the shutoff valve piston 21 on the right in FIG. 2, as best apparent in FIG. 2.

In the centrifugal force piston 15 an axial bore 18 is provided with radial outlets at its two ends so that the fluid pressure obtaining in the region of the neck 15a of the piston 15 always also acts on the radially inner end face of the centrifugal piston 15. The radially outer end face of the centrifugal force piston 15, which is subjected to the pressure of the spring, is further continuously under the pressure obtaining in the pump suction chamber via the outermost ring chamber 47 which is connected to the suction chamber 30 of the pump.

The shutoff valve piston 21 is continuously pressed to the right by the spring 20 (FIG. 2). The ring space 40 surrounding the neck 21a of the shutoff valve piston 21 is under the full pressure of the pressure space whilst a ring chamber 45 surrounding the left spring-loaded end face of the shutoff piston 21 is under the pressure of the suction chamber, i.e. low pressure. For this purpose the suction chamber 30 of the pump is connected to the ring spaces 45 via the recess 44 (FIGS. 2 and 3) arranged in the left pump end plate 5.

As long as the engine rotates with relatively low speed the centrifugal force piston 15 is in the position shown in FIGS. 2 and 4. This means that all the ring passages surrounding the centrifugal force piston 15, except for the ring passage 22 second radially from the outside in FIG. 4, are subjected only to the suction pressure of the pump. The high pressure of the pump acting in the ring passage 22 thus cannot exert any effect. The flow past the control edge 17 of the ring chamber 48 between the passage system 24 with the ring chamber 23 and the suction part of the pump is not obstructed. Thus, all that acts on the piston 15 from the outside and inside is the suction pressure of the pump and the force of the spring 16 and the centrifugal force. The shutoff valve piston 21 is held closed in this position by the spring 20 because the two annular piston end faces of the piston 21 subjected to the pressure of the high-pressure chamber 40 are of equal size and the high pressure thus cannot exert any effect and in the space 45 and the space for the spring 20 through a small corresponding radial bore the low pressure of the pump always obtains, as is also present in the region of the passages 24. Since therefore the short-circuit conduit is closed a high pressure obtains in the pressure chamber of the pump and prevents a relative rotation between the pump housing with the inner ring gear 7 on the one hand and the pump pinion 8 on the other. The drive of the auxiliary units is thus via the pulley 10.

If the engine speed is now increased up to the predefined shift speed the centrifugal force piston 15 is slowly radially forced outwardly by the centrifugal force against the force of the spring 16 until on reaching the shift speed the centrifugal force piston 15 first closes the passage at the control edge 17 (FIGS. 2 and 4). If the speed is further increased the neck 15a of the piston 15 frees the connection from the high-pressure ring chamber 22 to the control ring chamber 23. The high pressure of the pump is now conducted simultaneously via the passage 18 to the space in front of the radially inner end face of the piston 15 so that the piston now moves abruptly radially outwardly to its outer stop position. This shift is therefore carried out very precisely and energetically and does not permit any unstable grey zone of the shift speed. The high pressure of the pump now travels via the ring chamber 23 and the passage arrangement 24 to the spaces in front of the end faces 25, on the right in FIG. 2, of the three shutoff pistons 21 and quickly and reliably pushes the three shutoff pistons 21 to the left in FIG. 2 against the action of the spring 20. Thus, in each of the three shutoff valves a large-area connection is established between the ring chambers 45 and 40 (FIG. 2) so that a strong fluid flow can now take place from the pressure chamber 31 via the openings 42 to the ring chambers 40, from the latter to the ring chambers 45 and from the latter via the passage arrangement 44 shown in FIG. 3 to the suction chamber 30. The gear pump then cannot transmit any torque; the freewheel becomes effective and the output shaft 37 is now driven with correspondingly reduced speed.

In this state at high speed of the engine a remaining back-pressure still acts on the right end face 25, in FIG. 2, of the shutoff piston 21 because of course the pump now delivers oil with the differential speed between the pulley 10 and the pulley 12. This backpressure is of course far less than the assisting pressure necessary for torque transmission and consequently the spring 20 now tends to push the shutoff valve to the right again in FIG. 2, thus closing said valve. The spring 20 must therefore be made relatively weak so that it is unable to overcome this backpressure. The backpressure in the conduit 24 does not drop to the suction pressure of the pump again until on further decreasing speed the spring 16 again pushes the centrifugal force valve 15 radially inwardly and thereby closes the connection from the ring passage 22 to the ring passage 23 because said ring passage 23 of the centrifugal force valve is then again connected to the suction chamber of the pump and when the connection from the pressure chamber to the suction chamber in the region of the centrifugal force valve via the bore 18 is blocked the backpressure acting until then on the inner end face of the piston 15 now likewise drops again to the suction pressure of the pump. Since the backpressure is always higher than the suction pressure the speed at which the centrifugal force valve changes back again and interrupts the short-circuit conduit is lower than the speed at which the centrifugal force valve 15 released the short-circuit conduit because of course the end face 19 of the centrifugal force piston continues to be subjected to the backpressure until the spring force 16 can overcome not only the centrifugal force but in addition also the force of the backpressure.

In this manner the changing down of the speed of the shaft 37 will therefore take place at a substantially higher engine speed than the changing up again of the speed of the output shaft. The hysteresis path of the control behaviour thus created prevents an undesirably frequent changing up and down of the transmission illustrated.

Since with this construction at high speed large amounts of oil are circulated and thus heated relatively large heat losses must be dissipated by appropriate cooling fins 48. This construction is thus primarily suitable for low-speed motors, for example truck engines. On the other hand, this construction has considerable advantages.

For example, the very robust design presents no service life problems because the "transmission" is made up of V-belts which can easily be replaced. The mechanical losses of the "highspeed drive transmission" can also easily be eliminated by cooling because the V-belts have a large surface area and are exposed to air flow. Furthermore, the engine designer has great freedom in the selection of the transmission ratio interval. Also, due to the presence of two pulleys it is possible to divide the units. Some of the units can be directly driven by narrow V-belts.

When the hydrostatic coupling is closed said pulley rotates 1:1 with the crankshaft. When the coupling is open however said pulley rotates slower than the crankshaft. The speed of the units driven by the narrow V-belts is thus reduced. A second group of the units, for example the generator and the fan, is driven by flat belts (multiple V-belts). These units then rotate faster when the hydrostatic coupling is engaged because the flat belts run faster than corresponds to the crankshaft. When the coupling is disengaged said speed is reduced to the crankshaft speed because the power line now runs via the freewheel from the crankshaft directly to the flat belt pulley. The interval between the speeds depends on the configuration of the lay shaft which is absolutely essential here. Said lay shaft may at the same time be a unit shaft and can be constructed as desired by the engine designer. Of course, all the units run slower by the same difference when the coupling is disengaged than when it is engaged. In this manner the size of the pulleys can be adapted in optimum manner to the units for the best possible speed adaptation to the power requirement of the individual unit and thus to the total efficiency and to the smallest possible space requirement in the overall design. Finally, the V-belts have very good damping properties on the unit drive and also on the crankshaft rotational oscillations. Also, they do not produce any noise problems.

Figure 5:
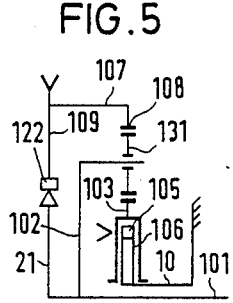
FIG. 5 the transmission scheme of a second embodiment in which a gear ring pump serves to block the sun gear of a planetary transmission.
Figure 6:
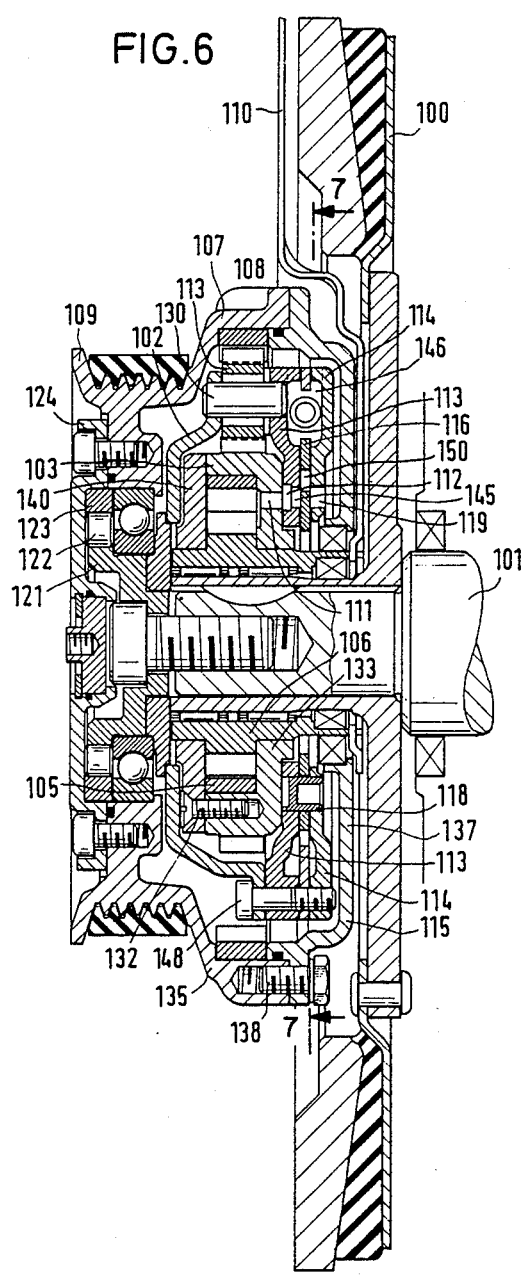
FIG. 6 shows the axial section through the transmission according to FIG. 5.
Figure 7:
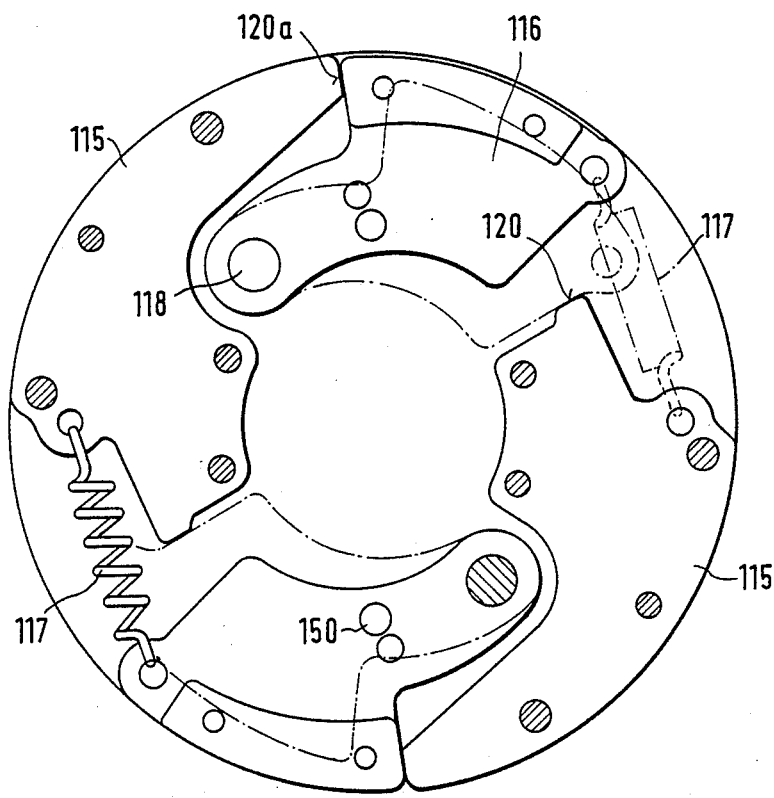
FIG. 7 shows the section VII—VII of FIG. 6.
Figure 8:
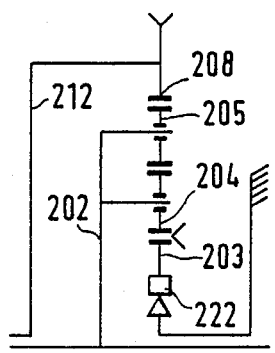
FIG. 8 the transmission scheme of a third embodiment in which planet gears and sun gear of the planetary transmission cooperate in the manner of a gear pump.

The second example of embodiment shown in FIGS. 5 to 7 represents a two-speed transmission according to the invention as up drive in which the speed of only one output element is regulated in that the sun gear of a planetary mechanism is blocked or released by means of a ring gear pump.

In this case as well the input shaft of the transmission is the crankshaft 101 of the engine. The planet carrier 102 of a planetary transmission is non-rotatably connected to said crankshaft.

As apparent from FIG. 6 on the front extension of the crankshaft 101 the vibration damper 100 of the internal-combustion engine is mounted and is non-rotatably attached with a collar to the reduced-diameter end of the crankshaft.

The planet carrier 102 non-rotatably connected to the crankshaft carries on planet journals 130 three planet gears 131 uniformly distributed over the periphery.

The planet gears 131 mesh on the outside with the ring gear 108 which is non-rotatably disposed in the housing 135 of the transmission which in turn is made integrally with the pulley 109. The transmission housing 135 is rotatably mounted via a freewheel 122 on an inner ring 121 of the freewheel which in turn is fixedly connected to the end face of the crankshaft. The freewheel 122 permits the housing 135 with the pulley 109 to overtake the crankshaft which otherwise directly drives the pulley 109 with the housing via the freewheel.

The housing 135 consists essentially as shown in FIG. 6 of a left housing part 107 and a right housing part 137 which are connected by means of the screws 138.

On the collar of the vibration damper 100 connected non-rotatably to the crankshaft 101 the pinion 106 of a ring gear pump is rotatably mounted by means of needle bearings. The pinion 106 is mounted as apparent from the drawing with a central sleeve on the needle bearings. The central sleeve of the pinion 106 is connected via a tool support 110 to the engine housing, which is not shown, so that the pinion 106 is arranged non-rotatably. An end plate 133 of the pump housing is mounted rotatably on the portion of the sleeve of the pinion projecting in FIG. 6 to the right in the axial direction beyond the pinion 106 and is formed integrally with the sun gear 103 which at the same time represents the peripheral wall of the pump housing. The left end wall of the pump housing in FIG. 6 is likewise formed by a ring plate 140 which is mounted on the sleeve of the pinion 106 and which is screwed by screws 132 to the sun gear as shown at the bottom of FIG. 6. The inner peripheral wall of the pump housing 140, 133 extends eccentrically to the pinion and to the rotary mounting of the housing on the pinion sleeve. The ring gear 105 of the ring gear pump is mounted thereon with its peripheral surface.

The ring gear pump does not have any outlet passages on its pressure side but only in the region of its suction chamber one or more supply passages 111 via which filling of the pump from a ring passage 112 is possible. Discharging of the pump takes place only through gap losses. The ring passage is in turn mounted in a plate 113 which covers the end face of the pump housing on the right in FIG. 6 and is carried by the planet carrier 102 and which therefore also revolves with said planet carrier. By means of the screws 148 a valve plate 114 is screwed to the planet carrier and the plate 113 via spacer plates 115. The valve plate 114 has oil passage bores 119 which connect the ring passsage 112 in the plate 113 to the interior of the transmission housing outside the carrier pump via short extension passages 145.

The form of the spacer plates 115 can be seen from FIG. 7. These two spacer plates in the example of embodiment leave between them and the plate 113 and valve plate 114 corresponding spaces in which two valve rockers 116 are disposed which in the axial direction fill the space between the plates 113 and 114. The valve rockers are each pivotally mounted about journals 118 and tension springs 117 arranged in the cavities 146 are secured at their one end to the spacer plates 115 and at their other end to the end of the rockers 116 remote from the mounting 118. The form of the rockers is apparent from FIG. 7. In their radial inner position occupied under the influence of the tension springs 117 valve passages 150 of the rockers 116 lie in coincidence with the passages 119 and 145 so that in this position the passage of oil from the interior of the transmission housing to the suction space of the ring gear pump is possible.

In FIG. 7 however the rockers are shown fully extended in their outwardly pivoted position under the influence of the centrifugal force against the spring force and in this position the passages 150 no longer align with the passages 119 and 145 and consequently block the passages to the suction chamber of the pump.

This transmission is therefore a two-speed transmission as updrive which is constructed as planetary mechanism of which the sun gear can be locked by means of the gear pump.

The housing of the transmission is filled with fluid to such an extent that at least a volume corresponding to the free interior of the ring gear pump is still free but on the other hand the filling must be at least large enough for the fluid level to cover the inlet passage 119 in the valve plate 114 when the gear pump and revolving transmission contain no oil and exceed the radial outer edge of said inlet outwardly only when the interior of the ring gear pump is completely filled with oil.

If no oil is supplied to the ring gear pump because the valve rockers 160 block the inlet passages 111 only a small pressure difference arises in the air and/or oil vapour in the pump and does not permit exertion of any appreciable torque. The pump can thus rotate without transmitting any torque. For lubricating the gears it is expedient for a certain amount of lubricating oil to be circulated in this operating state, through leakages in the suction throttle system. No problems are present in this respect.

If the engine rotates with low speed at which a drive of the auxiliary units is to take place at high speed, i.e. beneath the shift point, the valve rockers 116 lie under the influence of the springs 117 in their radial inner pivot position in which they free the passage of the oil from the housing interior via the passages 119, 150 and 11 to the pump so that the displacement spaces between the teeth of the pump gears can fill. When these spaces are full an assisting pressure arises which prevents the pump housing from rotating relatively to the non-rotatable pinion 6. Depending on the magnitude of the torque on the pump housing and thus on the sun gear of the planetary transmission, two leakage flows flow from the pressure chambers radially inwardly and from there to the planetary transmission housing and peripherally to the outside or to the suction chambers. A certain slip arises at the sun gear of the planetary transmission. The former part of said leakage flow must be replenished through the bores 111. Since at low engine speed these bores align with the bores 150 and 145 this is readily possible.

If the speed is now increased until the shift speed of the engine the rockers 116 pivot increasingly further outwardly under the influence of the centrifugal force until they finally bear on corresponding stops 20a. In this position the influx of oil into the interior of the gear pump is completely blocked. No more oil can reach the oil transport chambers between the teeth of the gears of the ring gear pump. The position of the bore 119 and of the stop 120a may be defined so that a small amount of lubricating oil flow still reaches the gear pump. In addition, however, in this position no appreciable torque transmission is possible because the leakage flows rapidly diminish the pressure in the pressure chamber of the pump. The pump housing and thus the sun gear 103 of the planetary transmission yields in the rotational direction so that no torque transmission is possible therethrough to the ring gear 8. The freewheel 122 is provided for this operating condition. The outer ring 123 of said freewheel is connected by the cover 124 fixedly to the output pulley 9 so that the operation of the units is now with a transmission ratio 1:1.

In such an updrive design the V-belt pulley on the crankshaft can be made smaller than hitherto. This therefore also makes it possible to avoid exceeding the maximum permissible unit speeds of rotation in spite of the higher maximum crankshaft speed increasingly employed in modern internal-combustion engines.

At low engine speed the auxiliary units then run faster than with the ratio 1:1 so that for example adequate electrical power is supplied by the generator or likewise for example adequate oil pressure is available from the power steering pump for the hydraulic steering when the engine is idling.

A substantial advantage of this construction resides in that the entire transmission can simply be substituted for the hitherto present pulley and the pulleys on the units can be retained. Since when the coupling is engaged (updrive operation) the pump housing is stationary and no oil circulates only the splash losses and the tooth friction losses at the planetary transmission occur and these can easily be eliminated by cooling by the large surface area of the rotating housing simultaneously representing the pulley. The production expenditure is also small because only one groove bearing is necessary. One of the needle cages shown could be dispensed with as well. Furthermore, the updrive permits any viscosity coupling previously present on the fan to be dispensed with because the fan can be made smaller.

The main advantage of this design resides however in that when the hydrostatic coupling is disengaged it does not circulate any oil but only air permeated with oil. As a result high engine speeds are possible. Since no hydrostatic oil pressure is generated any danger of cavitation erosion and cavitation noises is avoided.

In the third example of embodiment according to FIGS. 8 to 11 now to be described the mechanism is a plus planetary transmission, i.e. one in which the planet gears are arranged in pairs so that when the planet carrier is stationary both central gears rotate in the same direction, as reduction gear, the pressure throttle regulation taking place as in the first example shown.

The two-speed planetary transmission employed here does not have a separate gear pump. On the contrary, the sun gear and the planet gears in this case cooperate in the manner of a gear pump. Fundamentally, such a construction may also be designed so that the ring gear cooperates with the planet gears as gear pump.

In this construction on the crankshaft 201 the planet carrier 202 is secured by means of a support sleeve 202a on the crankshaft end 201. The planet carrier 202 carries by means of the journals 230 three circumferentially uniformly distributed pairs of planet gears 204 and 205. The two gears 204 and 205 mesh with each other. The gear 204 meshes with the sun gear 203 whilst the gear 205 meshes with the ring gear 208. The planet carrier 202 carries in FIG. 9 on the right of the planet gears a cover plate 231 which also supports the bolts 230. The intermediate space between the cover plate 231 and the planet carrier 202 is filled between every two adjacent planet gear sets by a filling piece 233 which leaves free between it, the adjacent planet gear 204 trailing in the direction of rotation and the sun gear 203 a pressure space 234 apparent in FIG. 10. As best apparent from FIG. 10 the gears of the wheel 204 which are covered along a portion of their periphery by the filling piece 233 in this covered region convey oil into the pressure chamber 234. The teeth of the sun gear 203 act in the same manner, the teeth of the wheel 205 of the planet pair leading in the direction of rotation likewise supplying oil to said gear 203.

Figure 9:
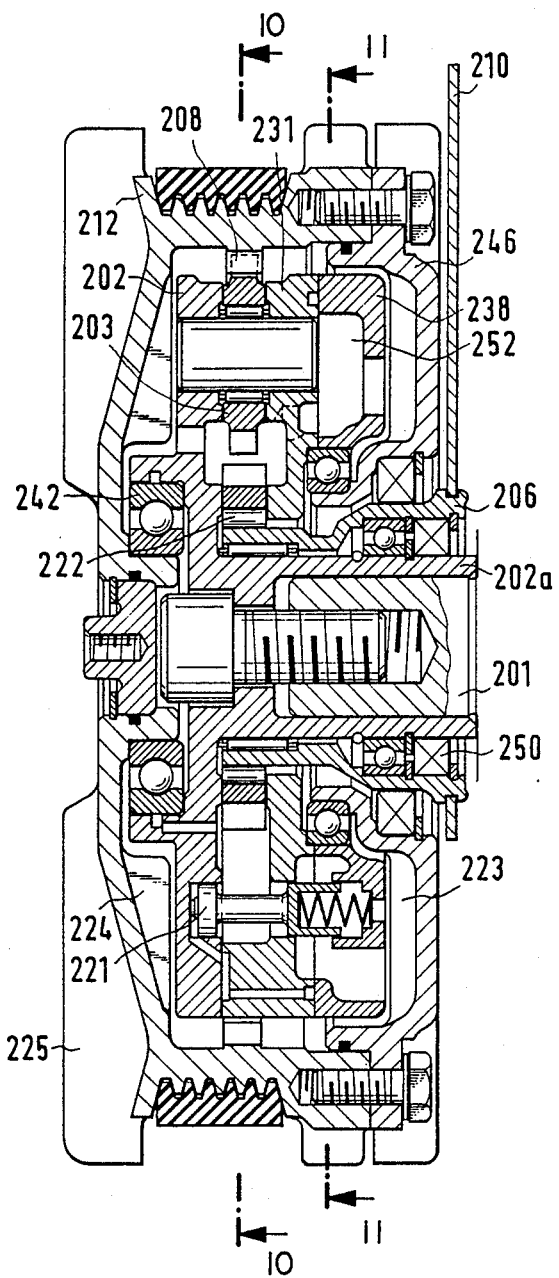
FIG. 9 shows the axial section through the transmission according to FIG. 8 corresponding to the section IX—IX of FIG. 10.

By means of needle and ball bearings shown in FIG. 9 a support sleeve 206 is mounted on the bearing sleeve 202a of the planet carrier 202 and is prevented from rotating by means of the torque support 210 which: is prevented from rotating by means of the torque support 210 which is secured in a manner not illustrated to the engine housing. In this manner the support sleeve 206 via the torque support 210 can transmit a torque to the inner ring of a freewheel 222 so that the latter prevents the sun gear mounted thereon from rotating backwards.

On its side remote from the gears, i.e. the right side in FIG. 9, the cover plate 231 carries an oil chamber plate 238 creating an oil chamber 252 on the right of the cover plate 231 in FIG. 9.

In the intermediate spaces between the planet gears the shutoff valves 221 are mounted in the pump housing formed by the parts 202, 231 and 233 and function in the same manner as the shutoff valves 21 in the first example. Said shutoff valves regulate the oil discharge from the pressure chambers 234. As in example 1 they are controlled by centrifugal force valves 240, one of which can be seen in FIG. 11.

Since the construction and mode of operation of said valve control is the same as in example 1, it will not be explained in detail here.

Finally, the transmission has a housing which has a housing pot 212 which is mounted on the planet carrier 202 by means of the ball bearings 242 and which as apparent from FIG. 9 is formed on the outside likewise as pulley. The housing pot is covered on its right side by the end plate 246 which in turn is mounted by means of the ball bearing 248 on the oil chamber plate 238. A seal 250 seals the interior of the transmission housing from the bearing sleeve 206.

With driven planet carrier and stationary sun gear 203 the speed of the ring gear is reduced compared with that of the planet carrier for example substantially in the ratio 1:1.75.

Figure 10:
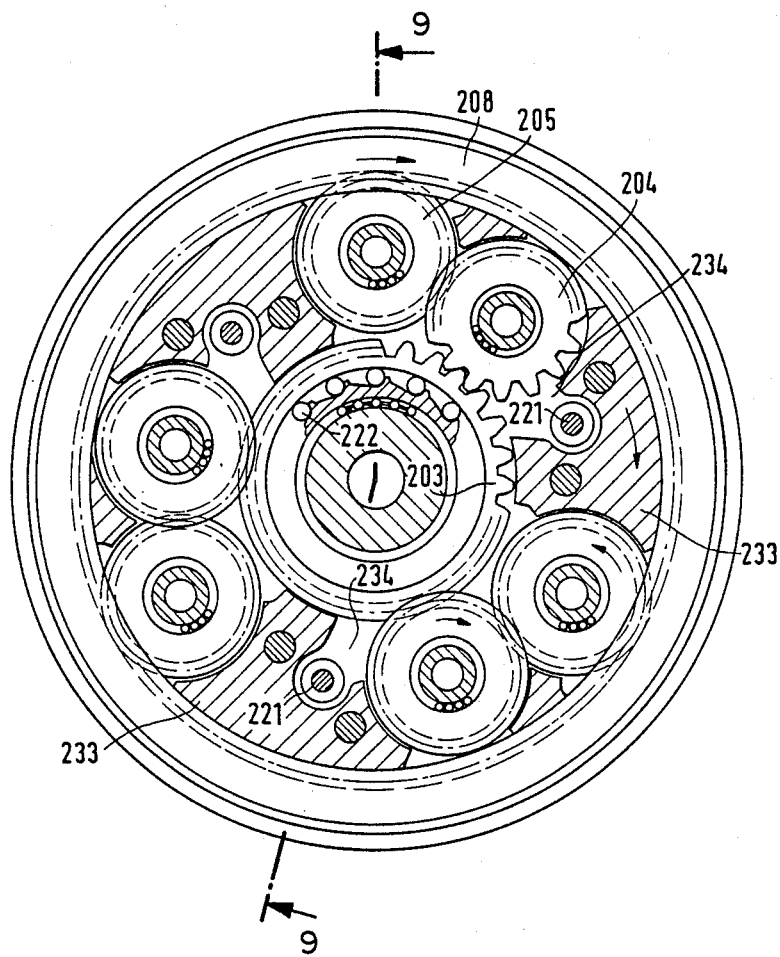
FIG. 10 shows the section X—X of FIG. 9.
Figure 11:
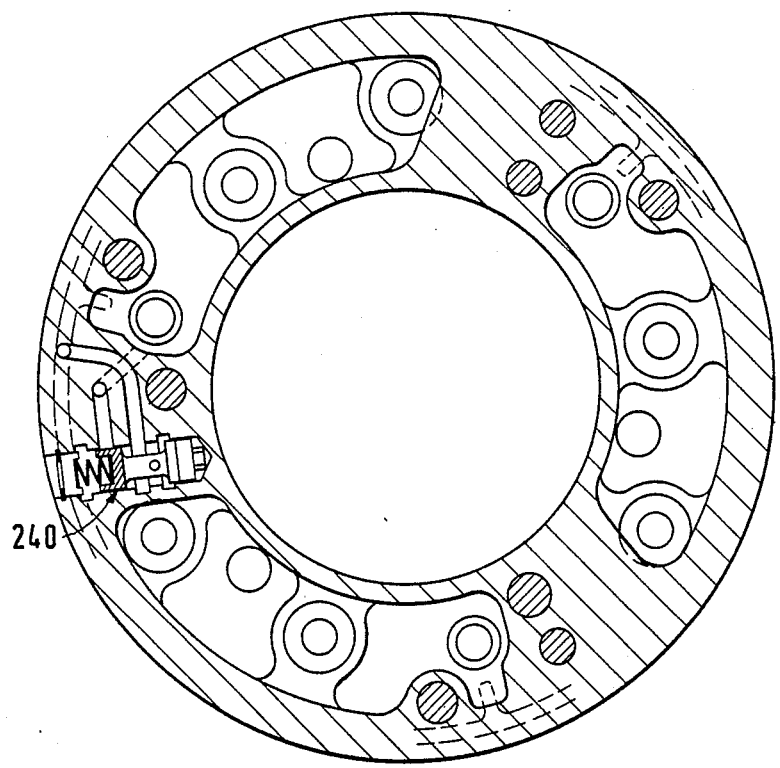
FIG. 11 shows the section XI—XI of FIG. 9.
Figure 12:
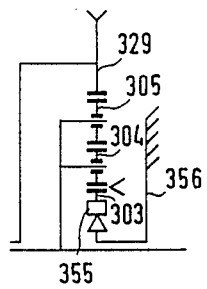
FIG. 12 shows the transmission scheme of a fourth embodiment in which the sun gear and planet gears of the planetary transmission likewise cooperate as gear pump.

In the present case the gear pump has a triple construction as best apparent from FIG. 10.

If the shutoff valves 221 are closed then in the three pressure chambers 234 under the gear pump action of the gears each partially bordering said pressure chambers a correspondingly high oil pressure is created which prevents further rotation of said gears relatively to the planet carrier 202. As a result the planet carrier 202 and sun gear 203 and thus also the ring gear revolve with the transmission ratio 1:1 from the crankshaft and thus drive the housing 212 with the pulley formed thereby with the speed of the crankshaft. The freewheel 222 between the sun gear 203 and the torque support 206/210 thereby lifts off because no reaction moment is transmitted to the engine housing thereby. If the shutoff valves are now opened in the manner known from the first example by increasing of the engine speed the pressure in the pressure chambers 234 drops to the idling pressure and the planetary transmission begins to rotate. A torque transmission directed from the planet carrier to the housing and thus to the pulley is no longer possible. The sun gear 203 now tends to rotate rearwardly against the engine speed but is prevented from doing so by the freewheel 222. The transmission therefore now runs in reducing operation with a reaction supporting moment against the sun gear. This operating state of reduced speed at the output continues up to the highest engine speed and must be suitable for permanent operation at said high speed. The total losses can lead to a considerable heating up of the transmission because during this operation considerable warming of the oil takes place.

To avoid these losses in this design not only outer cooling fins 225 and 226 are provided but also inner cooling fins 223 and 224.

In this construction, not only is the planet carrier housing 202, 231 sometimes filled with oil but also the transmission housing and the oil chamber 252. The filling is however not complete. In this case as well the oil level must be at least high enough for the teeth of the gears 204, when the transmission rotates, to be able to dip into the oil forced outwardly by centrifugal force even after filling of the pressure chamber 234 so that they can still convey oil or fluid to the pressure chambers 234. The oil level should however at the most be such that when the housing is revolving it still leaves the sun gear free.

In accordance with the foregoing with this construction the gears 203 and 204 act as genuine oil pumps because as long as the shutoff valve 221 is open they actually convey oil into the pressure chamber from which said oil can flow. This is thus also a genuine short-circuit or bypass operation as in the first example at high speed.

At lower engine speed the planetary transmission rotates en bloc so that the gears are stationary relatively to each other, gear noises thus being avoided. Such noises only occur at high engine speed when they are not troublesome. The transmission has a very short overall length. All the hydrostatic forces compensate each other and the constructional expenditure for the mountings and bearings is thus small. The planet gears can be large. This permits low planet gear speeds of rotation, high carrying numbers of the planet gear bearings and long life. The overall constructional expenditure is small.

Like the third example, the fourth example illustrated in FIGS. 12 to 15 represents a plus planetary transmission as reducing gearing but with a suction throttle regulation as is effected in the second example by the valve rockers 116. The constructional design here is however a different one. Said transmission is extremely short in the axial direction and also has smaller losses.

This transmission is suitable in an extremely advantageous manner for installation without major modifications being necessary in a vehicle instead of a previously present pulley without shift gear or transmission. The regulation here is the same as in the second example, i.e. a suction throttle control. In the example now to be described the crankshaft 301 again carries at its free end the vibration damper 391 on the collar 391a of which a support sleeve 354 is rotatably mounted by means of a tall bearing 353. In this case as well the support sleeve 354 carries the sun gear 303 of the planetary transmission via a freewheel 355. In a manner not shown the support sleeve 354 bears by means of the torque support 356 against the engine housing.

Figure 13:
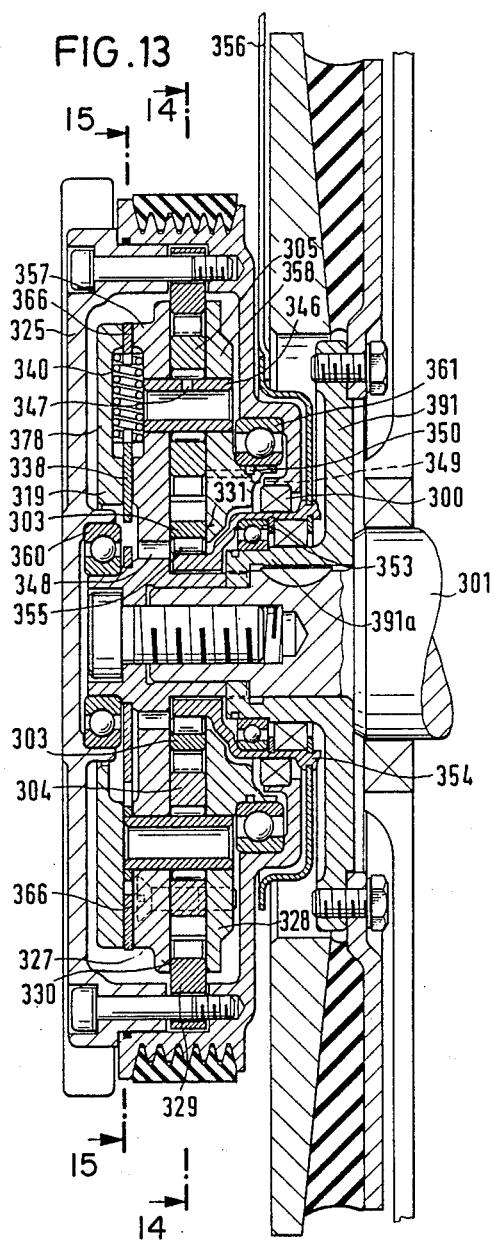
FIG. 13 shows the axial section through the transmission according to FIG. 12, the section being along the line XIII—XIII of FIG. 15.

In this case as well, similarly to the previous example, the planet carrier formed as pump housing is made up of a planet carrier plate 357 shown in FIG. 13 and fixedly connected to the crankshaft and an opposite planet carrier plate 358. Between the two plates planet gear journals 346 extend on which the planet gears 304 and 305 of three planet gear pairs revolve. The planet gears 304 mesh with the sun gear 303 and the planet gears 305 with the ring gear 329 which as in the previous example in this case as well is fixedly connected to the transmission housing 325. The transmission housing 325 is constructed at the same time as V-belt pulley as apparent from FIG. 13. The housing 325 is mounted rotatably on the planet carrier by means of the ball bearings 360 and 361 and sealed from the outside.

In this construction as well between the two planet carrier plates 357 and 358 in the spaces left free by the planet gears filling pieces 364 extend which as in the previous example result in the three planet gears 304 cooperating with the sun gear 331 as oil pump for building up corresponding oil pressure in the pressure chambers 336.

In this transmission the suction throttle regulation, as in the second example, is effected by means of three centrifugal weights of centrifugal force rockers 338 which are mounted pivotally about journals 339 (FIG. 15) in recesses in a spacer plate 366. The valve rockers are pressed radially inwardly by springs 340 whilst the centrifugal force tends to press them radially outwardly. Each of the three valve rockers 338 provided in this example has a valve bore 379 which at low speed of the transmission and thus radially inwardly disposed valve rockers 338 is provided with a corresponding bore 319 in the planet carrier plate 357 and a ring plate 378 placed outwardly on the latter. Thus, at low speed oil can flow through the bores 319 and 379 in each case into the suction regions of the gears 304 and 303 cooperating as gear pumps. On the other hand, the passages 319 are blocked when the valve rockers are pressed radially outwardly by centrifugal force, i.e at high engine speed.

Figure 14:
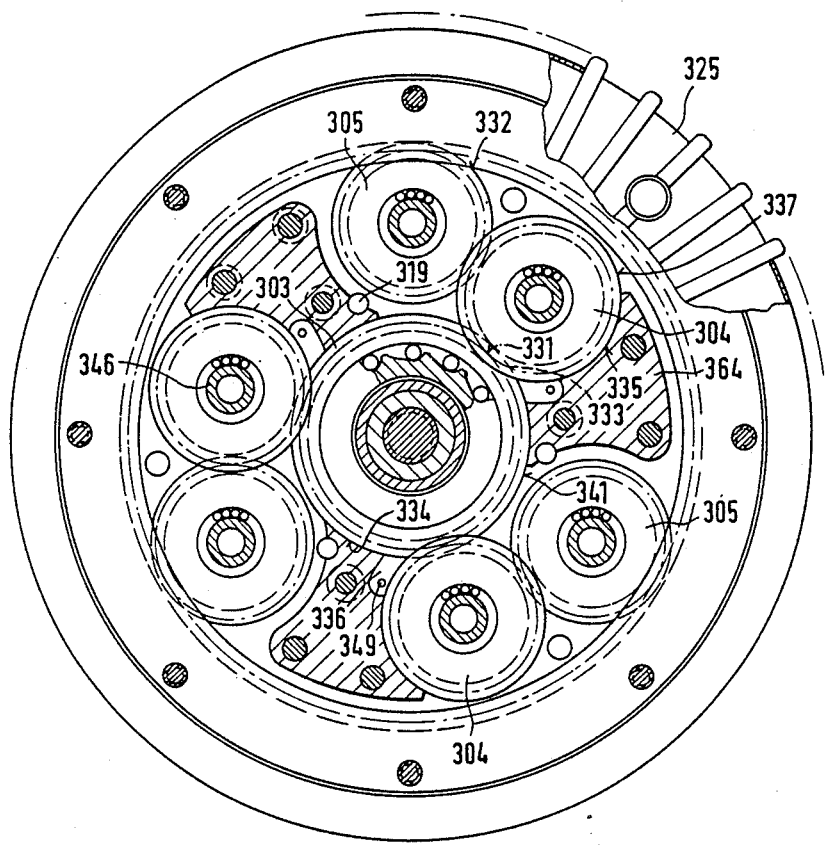
FIG. 14 shows the section XIV—XIV through FIG. 13.
Figure 15:
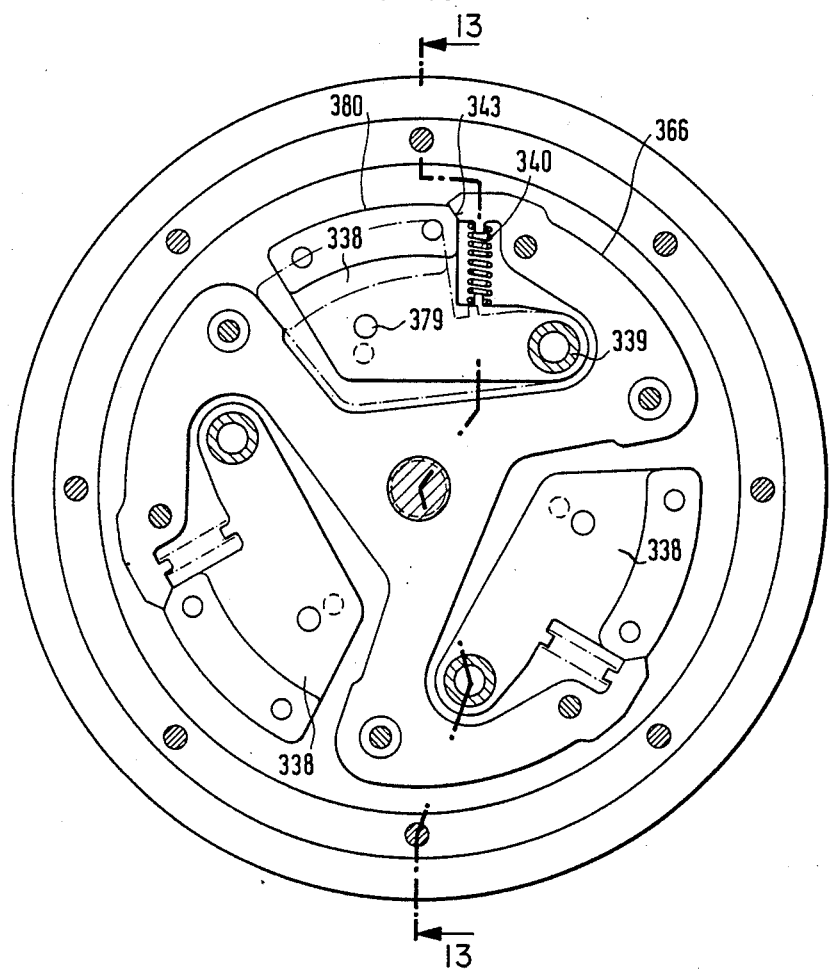
FIG. 15 shows the section XV—XV through FIG. 13.
Figure 16:
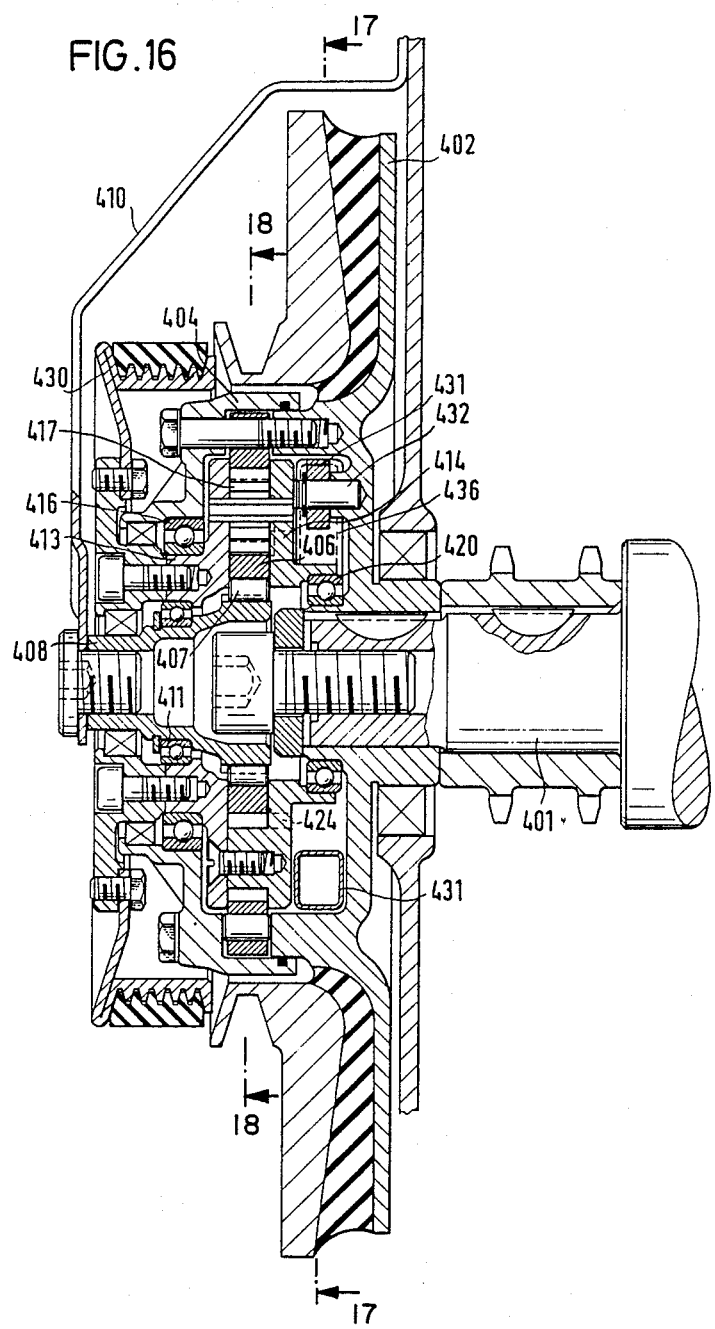
FIG. 16 shows an axial section through a further particularly favourable embodiment of the transmission according to the invention.
Figure 17:
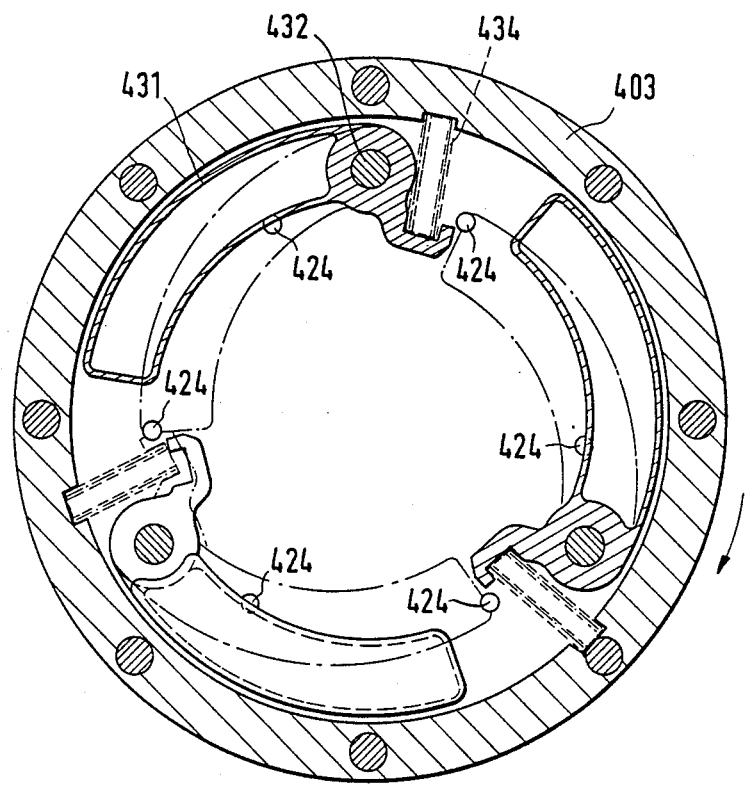
FIG. 17 shows the section XVII—XVII of FIG. 16.
Figure 18:
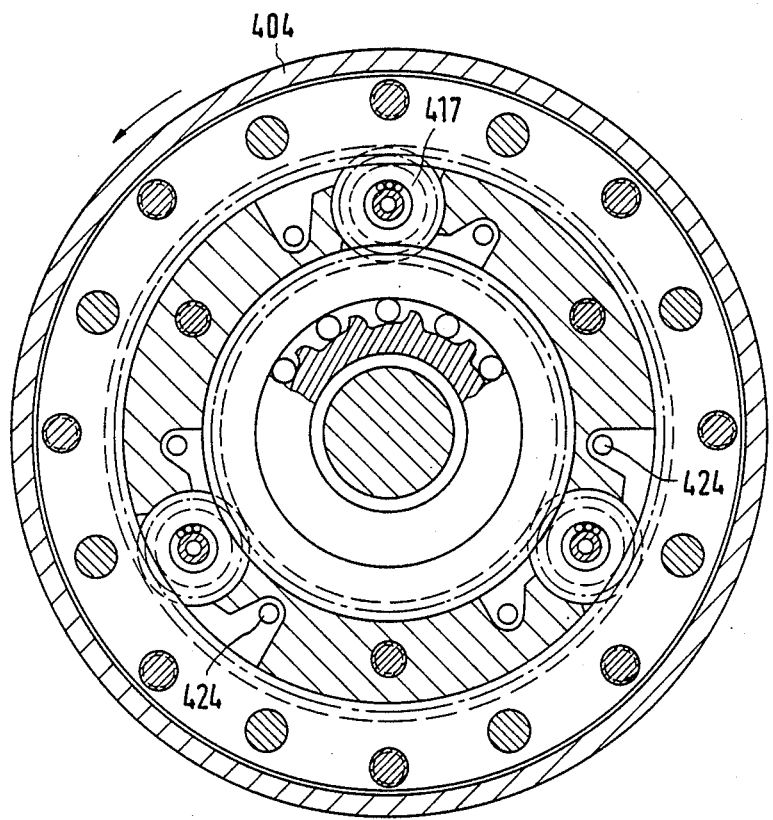
FIG. 18 shows the section XVIII—XVIII of FIG. 16.
Figure 19:
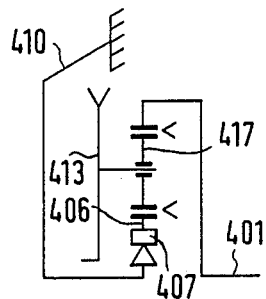
FIG. 19 shows the scheme of the transmission of FIGS. 16 to 18.

As apparent in FIG. 13 the walls 357 and 358 of the planet carrier engage outwardly over the ring gear 329 and at the positions 330 thus additionally seal the interior of the planetary mechanism. Since the sun gear 303 also seals this interior at the axial faces 331 only a slight leakage flow can penetrate the gear space. When the passages 319 are closed this leakage oil amount will primarily accumulate under the action of the centrifugal force at the outer periphery of the interior, i.e. in the region of the ring gear toothing, and extend inwardly depending on the amount, for example up to the radially outer peripheral edge of the filling pieces 364. If the various gears now rotate as indicated in FIG. 14 by arrows then at the points 331 of disengagement of the teeth increasing spaces are formed which produce partial vacuums having a suction effect. The points 332 of the engagement of the teeth each have a displacement effect. As long as there is an equal number of positions of disengagement and positions of engagement in such a closed space the suction and pressure points will neutralize each other so that no higher fluid pressure is to be expected.

In the transmission shown however the sealing faces 334 and 335 between the outer diameter face of the sun gear and of the planet gear 304 meshing with the sun gear and the filling piece lead to a pressure being built up in the space 336. The pressure is built up here because at the point 333 no oil can be conveyed away whilst the teeth gaps of the gears 304 and 303 can deliver oil to this point. Thus, oil can leave this pressure chamber when the passages 319 are closed only through the leakage cross-sections such as running gaps. The pressure in the space 336 then depends only on how much oil is in the teeth gaps of the two gears, i.e. of the sun gear 303 and the planet gear 304. As long as there is only a small amount of leakage oil in the planet carrier interior, which extends radially from outside for example only up to the radial outer edges of the filling pieces 364, no oil can be sucked in at the points 337 by the gear 304 because the latter is free just above the oil level defined by the centrifugal force. The small amounts of oil which perhaps nevertheless penetrate into the teeth gaps of the gear 304 are immediately thrown radially outwardly again by the centrifugal force. Only when the oil level increases further towards the inside will the teeth gaps of the gears 304 become sufficiently full to build up in the pressure spaces 336 an oil pressure which prevents further rotation of the gears of the planetary transmission with respect to each other and permits transmission of a torque.

Now, if the interior of the transmission housing surrounding the planet housing is filled with fluid up to just outside the sealing lip of the seal 300, when the throttle valve 319 is open, i.e. at low speed of the crankshaft, the oil can enter unrestricted into the inner transmission space between the gears of the planetary transmission and the filling pieces. A level equalisation will then take place substantially between the inside and the outside and the interior transmission space will also largely be filled with oil. Thus, at the point 337 and possibly also at the point 341 oil can now enter the teeth gaps of the gears 303 and 304 so that a high pressure results in the pressure chamber 336 which makes it possible to take up the torque derived at the pulley. In this manner the coupling operates with a transmission ratio 1:1 similar to the previously described example. Now, if the speed increases and a speed of for example 1200 revolutions of the crankshaft per minute is reached, the valve rockers 338 pivot outwardly to such an extent that the bores 379 thereof no longer align with the bores 319 and the passages 319 are therefore blocked. The valve rockers now bear on corresponding stops 343 of the spacer plate 366. The sole essential influx is blocked. Oil can enter the interior of the planet carrier now only at the gaps 330 between the planet carrier plates 357 and 358 and the ring gear 329 so that the pressure space 336 can discharge via the correspondingly dimensioned leakage gaps 331 between the sun gear 303 and the pump housing 357, 358. This discharging takes place the faster the higher the pressure in the space 36. The transmission chamber is continuously emptied in this manner via the position 337 so that the gear pump finally practically conveys nothing more and an appreciable pressure is no longer present in the pressure chamber 336. The planetary transmission can now revolve.

It is important here that the discharge of the pressure space 336 is not back to the planet carrier interior, i.e. the region between the planet gears, the fillers and the sun gear, but that said leakage oil passes to the outer housing interior between the planetary transmission and the outer housing walls. Consequently, the sealing point 334 is of great importance as is the axial sealing of the planet gear 304 with respect to the planet carrier plates 357 and 358. The other planet gear 305 of each planet gear set does not have a sealing function for the hydrostatic coupling and can thus run with adequate axial play, thereby considerably reducing the frictional losses. In FIG. 13 axial starting discs can be seen which effect the axial guiding of said planet gear. To reduce displacement pressures and splash losses between said planet gear 305 and the ring gear 329 the toothing of the ring gear is preferably made narrower than the planet gear 304 which of course must have exactly the same width as the sun gear 303. In this manner a reduction transmission suitable for high speeds of rotation as well is obtained, in which the gears operate largely in an empty space so that no splash and displacement losses occur when the transmission runs with high speed as reduction transmission. The viscous frictional losses in narrow gaps are also restricted to the extent necessary for the sealing of the pressure chamber 336 and consequently these losses are also reduced. To avoid the planetary transmission running completely dry and to ensure that the full needle planet gear bearings are adequately lubricated, advantageously the planet gear journals 346 are drilled hollow on the interior and provided with a corresponding bore for lubricating the planet gear bearings and the teeth.

It is also possible to provide a discharge bore 348 in the region of the freewheel 355 so that the leakage flow flowing from the pressure space in the interior of the planetary transmission into the interior of the outer housing reaches the latter pressureless as far as possible.

For the compensation of the forces in the three planet gear systems it is essential that in the respective pressure chambers 336 exactly the same hydrostatic pressure obtains in the coupling state. For this purpose bores 349 are provided which connect the pressure spaces 336 to a ring groove 350 which is cut into the seat region of the roller bearing 361.

In this manner a small equalizing flow can ensure that exactly the same pressure obtains in all the pressure chambers.

Since the losses are lower here the outer cooling fins 325 can also be made smaller and the entire arrangement requires a smaller axial extent than in the previous example.

For this reason this reducing transmission is particularly suitable for engines, for example 5 and 6 cylinder in-line engines, which have to be equipped with a rotational vibration damper 391. As can be seen from FIG. 13 this transmission fits particularly favourably into the extremely restricted space relationships between said vibration damper and the fan of such an engine.

In this fourth embodiment the regulation of the hydrostatic coupling is of very simple construction. Since the throttle valve for the oil circulation is arranged in the outer gear pumps operating as hydrostatic coupling in the suction passage, when the coupling is open (kinematically: reducing operation of the transmission) in the gear pumps no oil at all can be circulated because the influx is blocked. This reduces circulation losses. The planet carrier interior in which the total of 8 gears are in engagement with each other is also largely kept free from oil because the planet gears acting as oil pump gears and meshing with the sun gear continuously extract oil from said chamber. Thus, the oil displacement power and splashing work is reduced as is important in particular at high input speed. This solution also has a particularly short overall length because the cooling fin area can be reduced. Finally, low-noise operation is possible because of the reduced oil circulation and reduced cooling fin surface area.

However, the most favourable embodiment from many points of view appears to be the one explained below in accordance with FIGS. 16 to 19.

In this fifth embodiment as well the transmission is constructed as two-speed planetary transmission with drive at the ring gear. In this case as well the crankshaft 401 of the internal-combustion engine carries a vibration damper 402 which is "integrated" with the transmission to form a unit. The outer transmission housing thus revolves rigidly with the crankshaft 401. It is formed on the one hand by the part 403 of the vibration damper and on the other by the housing pot 404. In the housing the ring gear 405 of the planetary transmission is fixedly mounted as shown by the drawings. The sun gear 406 is mounted with the aid of a freewheel 407 on a sleeve 408 which extends the crankshaft and which is supported by means of a torque support 410 in a manner not shown on the engine housing. The sleeve 408 is mounted by means of a ball bearing 411 in the planet carrier which consists of two plates 413 and 414 complementing each other to form a planet carrier housing. The planet carrier 413, 414 is in turn rotatably mounted by means of a ball bearing 416 in the housing pot 404 of the transmission. It carries in usual manner by means of planet carrier shafts three planet gears 417 which are uniformly distributed over the periphery and each of which meshes at the same time with the sun gear 406 and the ring gear 405.

The plate 414 is likewise mounted via a ball bearing 420 on the part 403 of the vibration damper of the internal-combustion engine. Thus, in this case the ring gear is rigidly connected to the crankshaft whilst the sun gear is supported via a freewheel against the engine housing and the planet carrier can freely revolve. The planet carrier carries the output pulley. In this case as well the three planet gears 417 cooperate with the sun gear 406 or also with the ring gear 405 similarly to the two previously described examples as gear pumps and thus form the hydrostatic coupling.

In this case the regulation is in dependence upon the input speed via the filling or non-filling of the planet carrier interior with fluid at the inlet 424. These six inlet holes 424 are cut in the plate 414. Depending on the level of the fluid defined by the centrifugal force in its form in the interior of the transmission housing 404, via the influx openings 424 fluid can flow into the interior of the planet carrier housing acting as pump. If the oil level is high fluid flows through the openings 424, is pressed by the "gear pump" into the pressure chamber and there blocks the revolving of the gears of the planetary transmission relatively to each other. If however the fluid level in the rotating transmission housing is correspondingly low, i.e. the diameter of the fluid level correspondingly large, no more fluid can penetrate, the fluid present is expelled through the leakage gaps and the transmission can revolve. In this state the sun gear acts as torque support because it is supported on the freewheel 407 and the pulley 430, which is fixedly connected to the planet carrier, as can be seen from the drawings, now rotates with reduced speed.

The necessary oil level change is effected here in extremely simple manner by three floats 431 which are mounted via pins 432 on the part 403. Said floats are hollow metal bodies of which the "specific weight" is lower than that of the fluid. These three floats 431 are subjected to the pressure of springs 434 which as apparent from FIG. 17 tend to pivot the floats clockwise radially outwardly. The floats are disposed in the ring chamber 436 partially filled with oil.

If the engine rotates at low speed the floats are pressed outwardly by the springs 434. As a result the oil level in the revolving housing is relatively high and oil can flow via the overflow edges of the passages 424 into the interior of the pump chamber formed by the planet carrier housing. Pressure is now built up in the interior of the pump and prevents a relative rotation of the pump gears so that the pulley 430 is now driven with the crankshaft speed. If the speed rises beyond a predetermined shift point the oil in the ring chamber 436 under the influence of the centrifugal force at a predetermined speed, for example 1200 rpm, forces the floats radially inwardly, since they are of course lighter than the oil. As a result the inner oil level moves radially outwardly. No more oil can then flow through the passages 424 and under the influence of the torque the pump via gap losses pumps its pressure chambers more or less empty and can now rotate. The output is now via the planet carrier rotating relatively to the housing with reduced speed. This state is achieved after a certain speed increase of for example 200 rpm.

This construction has substantial advantages. Thus, it is constructionally not at all complicated because only three planet gears are necessary and the overall structure of the control system is extremely simple. The power loss is small and the construction is compact. Also, when the planetary transmission rotates the planet gear speeds are low. Finally, the centrifugal force loading of the planet bearings is substantially reduced because in the operation of the planetary transmission the web rotates with a smaller speed of rotation than the crankshaft.

An essential optional feature of the invention resides in that the housing accommodating the gear set is mounted rotatably relatively to the engine and revolves in at least one of the two shift states.

Above five different embodiments have been described which are each preferred. It is obvious to the expert that the various features of different embodiments can also be appropriately combined with each other. Thus, for example, a regulation in accordance with the last embodiment is also possible in the other embodiments and then possibly the floats cannot be constructed as floats but as displacement bodies which are heavier than the oil.

In this case the oil level increases with increasing speed of rotation.

We claim:

1. An automatic two-speed transmission for the drive of at least one auxiliary unit (dynamo, fan, etc.) of a motor vehicle internal-combustion engine by the latter comprising a gear set in which at least one gear of which the axis of rotation orbits about the axis of rotation of another gear concentric with the input shaft of the transmission is in engagement with said other gear, a control element which is formed as freewheel, and a further control element rotating with an input shaft and actuable by centrifugal force for retarding and releasing the relative rotation between the gears of the gear set, wherein the transmission comprises a housing revolving concentrically to the input shaft and containing a fluid supply, at least two gears of the gear set cooperate in the manner of a hydrostatic pump and can be influenced with the fluid, and the centrifugal control element also revolving with the housing controls the influencing of the pump.

2. A transmission according to claim 1, wherein the gear set is formed by the pinion and internal ring gear of a ring gear pump of which the suction chamber and pressure chamber are connected by a fluid circulation and the centrifugal control element controls the flow in said circulation.

3. A transmission according to claim 2, wherein the pump pinion is arranged concentrically to the input shaft.

4. A transmission according to claim 1, wherein two output elements are provided of which the one is drivable via a freewheel directly by the crankshaft and the other is fixedly connected to the pinion of the ring gear pump of which the housing is fixedly connected to the crank-shaft so that when the fluid circulation is open the ring gear can revolve relatively to the pump housing and the one output element is entrained by the input shaft via the freewheel whilst with a closed fluid circulation the pump housing entrains the pinion and thus transmits in fast speed (FIGS. 1-4).

5. A transmission according to claim 4, wherein the ring gear pump housing is the transmission housing.

6. A planetary transmission according to claim 2, wherein the ring gear pump on throttling the fluid circulation retards the smaller central gear of the planetary transmission or releases said gear for rotation (FIGS. 5-7).

7. A transmission according to claim 6, wherein the smaller central gear is formed as sun gear.

8. A transmission according to claim 7, wherein the pinion of the ring gear pump is not rotatable and the freely rotatably mounted housing of said pump is fixedly connected to the sun gear.

9. A transmission according to claim 8, wherein the output fixedly connected to the transmission housing is drivable via a freewheel directly by the input shaft, the planet carrier is fixedly connected to the input shaft and the ring gear is fixedly connected to the transmission housing.

10. A planetary transmission according to claim 1, wherein the gear set is formed by at least two intermeshing gears of the planetary transmission.

11. A planetary transmission according to claim 10, wherein a filling piece fills the space between the outside diameter faces of the meshing gears where the teeth thereof taper towards each other except for a pressure chamber near the engagement region and the retardation or release is effected by control of an influx passage to the intake region of the gear pump thus formed or of an efflux passage from the pressure chamber (FIGS. 8-17).

12. A planetary transmission according to claim 10, wherein the sun gear and at least one planet gear form the gear set, preferably each planet gear meshing with another planet gear or the ring gear (FIGS. 8-15).

13. A planetary transmission according to claim 10, wherein the planetary transmission except for the ring gear is arranged in a closed inner housing which revolves in the transmission housing and the fluid influx of which can be blocked by means of a centrifugal-force-controlled valve arrangement and which is adapted to be discharged via small throttle passages with flow resistance by the pump action (FIGS. 12-15).

14. A transmission according to claim 1, wherein the centrifugal force control element comprises a centrifugal force valve which is connected to the fluid circulation in the housing (inner housing) rotating with the input shaft and which is mounted for actuation by centrifugal force against spring force in the pump housing (inner housing) and controls the flow in the circulation (FIGS. 2, 3, 4).

15. A transmission according to claim 14, wherein the centrifugal force valve can shut off the flow via at least one shutoff valve in the circuit formed by a short-circuit conduit from the pressure chamber to the suction chamber of the gear pump.

16. A transmission according to claim 14, wherein the centrifugal force valve comprises a piston displaceable radially of the axis of rotation of the housing against spring force by the centrifugal force.

17. A transmission according to claim 14, wherein the shutoff valve comprises a piston displaceable transversely of the direction of the centrifugal force against the spring force by fluid pressure.

18. A transmission according to claim 14, wherein the centrifugal force valve when the rotational speed of the input shaft increases interrupts the flow in the circulation at a speed of the input shaft which is appreciably higher than the speed at which the centrifugal force valve releases the flow again when the rotational speed drops.

19. A transmission according to claim 18, wherein the centrifugal force valve in its position close to the axis connects only the suction side of the gear pump to a control pressure space which is partially defined by an end wall of the shutoff valve piston, the pressure in the control pressure space tends to urge the piston of the shutoff valve against the force of the spring thereof into a position releasing the short-circuit line from the pressure chamber to the suction chamber and that in the latter position the control pressure space of the shutoff valve is connected to the pressure side of the gear pump.

20. A transmission according to claim 14, wherein the centrigual force control element is formed as throttle valve (FIGS. 7 and 15) which can throttle the fluid passage in continuously variable manner by 0% to 100%.

21. A transmission according to claim 20, wherein the throttle valve comprises at least one flat slide which is displaceable in the rotational plane of the transmission and which has a passage which in its one limit position releases a passage for the circulation in the housing and in its other limit position blocks the housing passage, said passage extending transversely of the plane of the slide.

22. A transmission according to claim 21, wherein the slide valve is formed as plate pivotally mounted in the transmission housing.

23. A transmission according to claim 10, wherein the centrifugal force control element as valve arrangement comprises a permanently open influx opening from the fluid supply chamber to the suction side of the pump, in the fluid supply chamber at least one displacement body is provided which has a specific weight different to that of the fluid and under the influence of the centrifugal force and a spring force is movable radially outwardly and inwardly in dependence upon the input speed, and the displacement body in its outer position by displacement of the fluid raises the fluid level formed by the centrifugal force inwardly to such an extent that fluid can flow through the influx opening into the suction chamber of the pump and fill the latter and also the pressure chamber whilst with internally disposed float the fluid level does not reach the influx opening.

24. A transmission according to claim 23, wherein the displacement body is a float which is urged by the spring force radially outwardly into the fluid and by which fluid outwardly pressed by the centrifugal force can be pressed radially inwardly against the spring force.

25. A transmission according to claim 23, wherein the displacement body has the form of an annular sector and at one end is mounted pivotally about an axis parallel to the input shaft.

26. A transmission according to claim 2, wherein the fluid circulation behind the pressure chamber of the pump there is a partially gas-filled fluid supply chamber and the centrifugal control element controls the flow from the fluid supply chamber to the suction chamber of the pump.

* * * * *